United States Patent
Wild et al.

[11] Patent Number: 6,109,249
[45] Date of Patent: Aug. 29, 2000

[54] SYSTEM FOR OPERATING AN INTERNAL COMBUSTION ENGINE

[75] Inventors: Ernst Wild, Oberriexingen; Lutz Reuschenbach, Stuttgart; Nikolaus Benninger, Vaihingen; Hendrik Koerner, Mechenheim; Werner Hess, Stuttgart; Hong Zhang, Regensburg; Georg Mallebrein, Singen; Harald von Hofmann, Lehre, all of Germany

[73] Assignee: Robert Bosch GmbH, Stuttgart, Germany

[21] Appl. No.: 09/153,764

[22] Filed: Sep. 15, 1998

[30] Foreign Application Priority Data

Sep. 17, 1997 [DE] Germany .............. 197 40 919
Dec. 19, 1997 [DE] Germany .............. 197 56 619

[51] Int. Cl.[7] .................... F02M 25/07; F02D 41/18
[52] U.S. Cl. ............... 123/568.21; 701/108; 123/494
[58] Field of Search ............ 123/568.21, 568.22, 123/568.23, 568.24, 568.25, 568.26, 568.27, 568.8, 494; 701/108

[56] References Cited

U.S. PATENT DOCUMENTS

| | | | |
|---|---|---|---|
| 4,644,474 | 2/1987 | Aposchanski et al. | 701/108 |
| 4,999,781 | 3/1991 | Holl et al. | 701/108 |
| 5,190,017 | 3/1993 | Cullen et al. | 123/568.22 |
| 5,205,260 | 4/1993 | Takahashi et al. | 123/494 |
| 5,503,129 | 4/1996 | Robichaux et al. | 123/568.21 |
| 5,889,203 | 3/1999 | Wild et al. | 123/568.21 |

*Primary Examiner*—Willis R. Wolfe
*Attorney, Agent, or Firm*—Kenyon & Kenyon

[57] ABSTRACT

An internal combustion engine, in particular for a motor vehicle, includes a throttle arranged in an intake pipe, through which air can be fed to a combustion chamber. Furthermore, the internal combustion engine includes a valve arranged in an exhaust gas recirculation line, through which exhaust gas can be fed to the intake pipe. A first mass flow through the throttle can be determined by a control device. Furthermore, a second mass flow through the valve can be determined by the control device. Finally, a third mass flow fed to the combustion chamber can be determined by the control device from the first mass flow through the throttle and the second mass flow through the valve.

21 Claims, 3 Drawing Sheets

SYSTEM FOR OPERATING AN INTERNAL COMBUSTION ENGINE

FIELD OF THE INVENTION

The present invention relates to a method for operating an internal combustion engine, in particular for a motor vehicle, in which air is fed to a combustion chamber through a throttle arranged in an intake pipe, the mass flow through the throttle being determined, and in which exhaust gas is fed to the intake pipe through a valve arranged in an exhaust gas recirculation line. Furthermore, the present invention relates to an internal combustion engine, in particular for a motor vehicle, with a valve arranged in an intake pipe, through which air can be fed to a combustion chamber. A valve is arranged in an exhaust gas recirculation line, through which exhaust gas can be fed to the intake pipe, and with a control device, with which the mass flow through the throttle can be determined.

BACKGROUND INFORMATION

Demands placed on a modern internal combustion engine, with respect to a reduction of fuel consumed and of exhaust gases and pollutants emitted, are ever increasing. For this reason, it is necessary to further improve the metering of fuel into the combustion chamber of the internal combustion engine, particularly to determine even more precisely the fuel mass to be metered. For this reason, in conventional internal combustion engines, the mass flow of the air fed to the combustion chamber through the throttle is determined with the help of an air mass sensor, for example, an HFM sensor. The mass flow determined in such manner is then used to calculate the appropriate fuel mass to be injected which would be required to achieve the driving condition desired by the driver of the vehicle, for example an acceleration of the vehicle.

In particular, for further reduction of the emitted exhaust gases, modern internal combustion engines are provided with an exhaust gas recirculation, in which the exhaust gas emitted from the combustion chamber is recirculated again through a valve to the intake pipe and thus ultimately to the combustion chamber. This exhaust gas recirculation must be taken into account in determining the fuel mass to be injected.

SUMMARY OF THE INVENTION

An object of the present invention is to provide a method for operating an internal combustion engine in which the exhaust gas recirculation is taken into account in calculating the fuel mass to be metered.

This object is achieved using a method and a combustion engine according to the present invention by determining the mass flow through the valve, and by determining, from the mass flow through the throttle and the mass flow through the valve, a mass flow to the combustion chamber.

By determining the mass flow through the valve in the exhaust gas recirculation line, it is possible to take the exhaust gas recirculation into account in determining the fuel mass to be injected into the internal combustion engine. In this way, the precision of the injection can be increased and thus a greater reduction of fuel consumption and exhaust gas emission can be achieved.

In an exemplary embodiment of the present invention, the pressure in the intake pipe is first determined from the mass flow through the throttle and from the mass flow through the valve. This pressure in the intake pipe represents an essential variable in determining the fuel mass to be injected. For this reason it is important to derive this pressure from the mass flow through the throttle and from the pressure through the valve.

In another embodiment of the present invention, it is advantageous when the mass flow through the throttle and the mass flow through the valve are integrated, and when the pressure in the intake pipe is determined as a function of parameters of the internal combustion engine. Through the integration of the mass flow through the throttle, or the mass flow through the valve, the storage function of the intake pipe is ultimately emulated. Thus, it is possible to take into account this storage function and its consequences, for example, time delays in determining the fuel mass to be injected.

In another embodiment of the present invention, the pressure in the intake pipe is converted into the mass flow fed to the combustion chamber as a function of parameters of the internal combustion engine. The determined mass flow fed to the combustion chamber can be linked to the mass flows through the throttle and through the valve.

In another embodiment of the present invention, the mass flow fed to the combustion chamber is linked with a factor which matches that proportion of the mass flow which is fed through the valve to the intake pipe. This takes into account that the exhaust gas recirculated through the valve goes into the mass flow to the combustion chamber.

In this context, it is advantageous if the mass flow linked with the factor is linked with the mass flow through the valve. In this manner, feedback with regard to the proportion of exhaust gas in the mass flow fed to the combustion chamber is obtained.

In another embodiment of the present invention, the mass flow fed to the combustion chamber is linked with a factor which is equal to that proportion of the mass flow which is fed through the throttle to the intake pipe. This takes into account that the air fed through the throttle only partially goes into the mass flow to the combustion chamber.

In this context, it is advantageous if the mass flow linked with the factor is linked with the mass flow through the throttle. In this manner, feedback with regard to the proportion of fresh gas in the mass flow fed to the combustion chamber is obtained.

In another embodiment of the present invention, a standard mass flow through the valve is first determined from a pulse-duty factor of the valve, and then the mass flow through the valve is determined as a function of parameters of the internal combustion engine from the standard mass flow. This represents an especially simple and yet precise option for determining the mass flow through the valve from the pulse-duty factor with which the valve is controlled.

In addition, the method according to the present invention can be implemented in the form of a control element which is provided for a control device of an internal combustion engine, in particular of a motor vehicle. In this case, a program is stored on the control element, which can be run on a computing device, in particular a microprocessor, and which is suitable for carrying out the method according to the present invention. In this case, therefore, the present invention is implemented by a program stored on the control element, so that this control element provided with the program represents the present invention in the same way as does the method which the program is suited to carry out. As a control element, an electrical storage medium can be used in particular, for example a read-only-memory.

DETAILED DESCRIPTION

Figure 1:
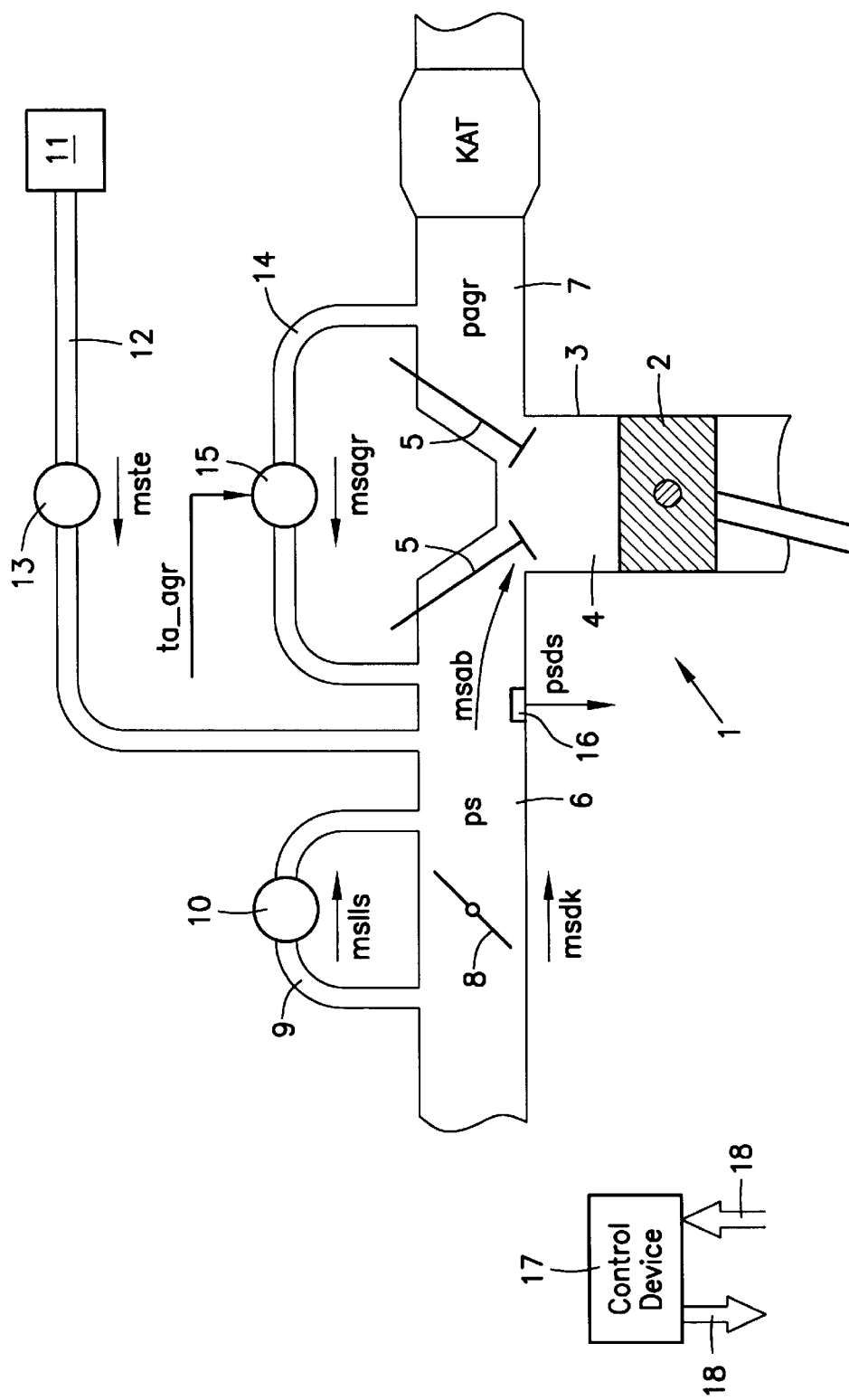
FIG. 1 shows a block diagram of an exemplary embodiment of an internal combustion engine of a motor vehicle according to the present invention.

In FIG. 1, an internal combustion engine 1 of a motor vehicle is provided in which a piston 2 is movable back and forth within a cylinder 3. Cylinder 3 is provided with a combustion chamber 4, to which an intake pipe 6 and an exhaust pipe 7 are attached through valves 5. In addition, an injection valve and a spark plug (not illustrated) are assigned to combustion chamber 4.

A rotatable throttle 8 is placed in intake pipe 6, to which an angle sensor (not illustrated) is assigned, with which the angle position of throttle 8 can be measured.

Parallel to throttle 8, an idle speed actuator is provided which has a bypass 9 in which a valve 10 is placed. Bypass 9 circumvents throttle 8, and the flow through bypass 9 can be influenced with valve 10.

Between throttle 8 and combustion chamber 4, a tank vent opens into intake pipe 6. The tank vent has an activated carbon filter 11 which is connected to intake pipe 6 through a line 12, and a valve 13 is placed in line 12. Through line 12, regenerated gas can be fed from activated carbon filter 11 to combustion chamber 4, and the feed of regenerated gas to intake pipe 6 can be influenced using valve 13.

From exhaust gas pipe 7, an exhaust gas recirculation line 14 leads back to intake pipe 6. A valve 15, with which the exhaust gas recirculation to intake pipe 6 can be influenced, is placed in exhaust gas recirculation line 14.

In the area of intake pipe 6, a pressure sensor 16 can be arranged which measures pressure ps in intake pipe 6. Since in this case, it is an actually measured pressure, this pressure measured by pressure sensor 16 is labeled psds. Pressure sensor 16 need not necessarily be present.

Upstream from throttle 8 and the idle speed actuator, a charger may be inserted in intake pipe 6, through which air can be fed to intake pipe 6. In addition, an air mass sensor, e.g., an HFM sensor, may be inserted upstream from the charger, through which air is also fed. Preferably, a catalytic converter is placed in exhaust gas pipe 7.

The air mass flowing through throttle 8 is designated as mass flow msdk, the exhaust gas flowing through valve 15 as mass flow msagr, and the air-exhaust mixture fed to combustion chamber 4 as mass flow msab.

In addition, internal combustion engine 1 is provided with a control device 17 which is coupled through appropriate electrical connections 18 with the sensors of internal combustion engine 1, e.g., with the angle sensor and/or pressure sensor 16, if present, assigned to throttle 8, and with the actuators of internal combustion engine 1, e.g., with valves 10, 13, 15.

Figure 2:
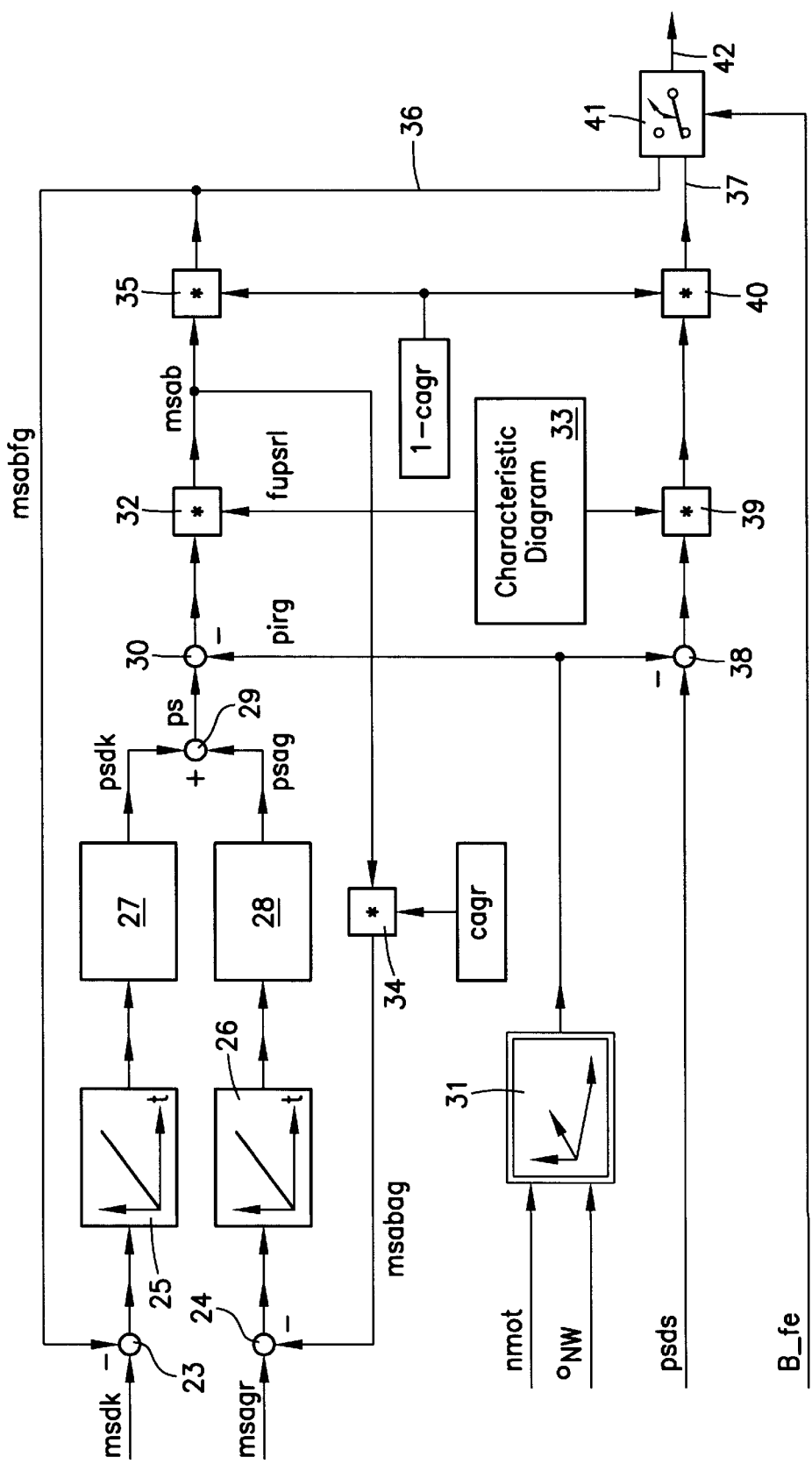
FIG. 2 shows a block diagram of an exemplary embodiment of a method according to the present invention for operating an internal combustion engine illustrated in FIG. 1.

FIG. 2 shows a method for operating internal combustion engine 1, which is carried out by control device 17. The idle speed actuator with mass flow mslls and the tank vent with the mass flow mste may be present, but need not be. In the method illustrated in FIG. 2, these mass flows are not taken into account, but they may be introduced at any time by appropriate, in particular additive, linkages. In addition, in the method illustrated in FIG. 2, it is assumed that no charger is present. The changer, however, could likewise be appropriately taken into account at any time, if present.

The method shown in FIG. 2 is based on mass flow msdk through throttle 8 and mass flow msagr through valve 15. Mass flow msdk is determined from the angular position of throttle 8, in that a standard mass flow is determined first which is then adjusted by temperature-dependent and/or pressure-dependent factors to the actual conditions of internal combustion engine 1.

Figure 3:
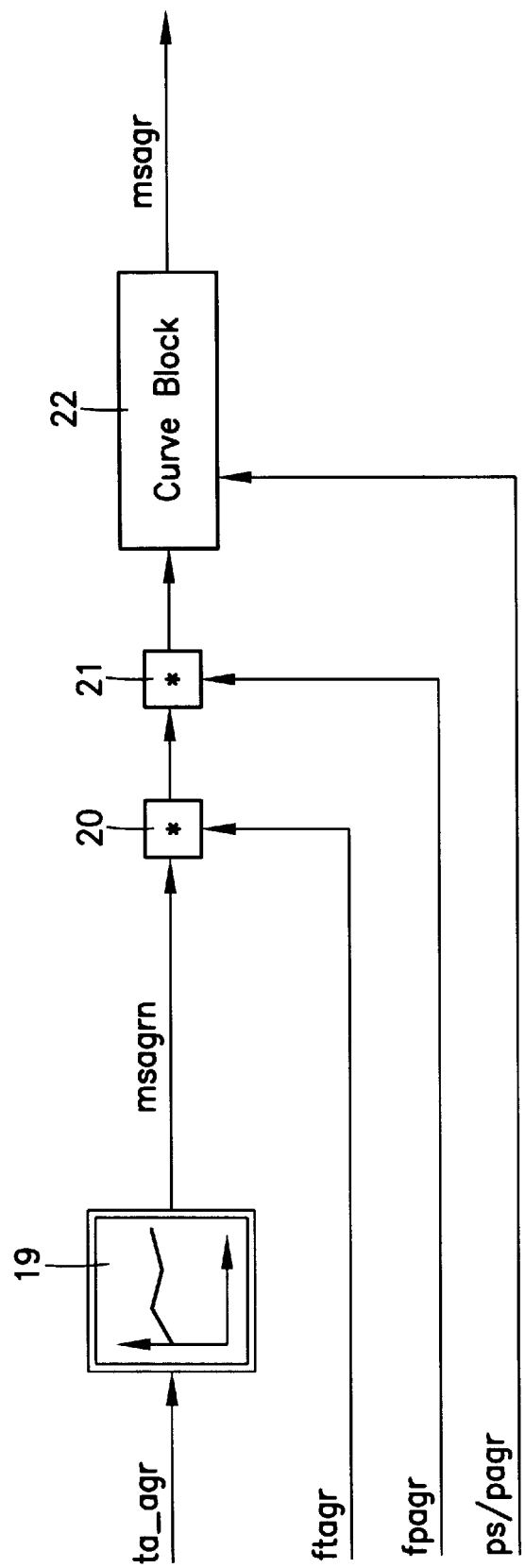
FIG. 3 shows a block diagram for use with the method shown in FIG. 2.

Mass flow msagr through valve 15 in exhaust gas recirculation line 14 is determined according to the method shown in FIG. 3. This method, too, is carried out by control device 17.

Valve 15 is controlled with a pulse-duty factor ta_agr. This pulse-duty factor ta_agr is fed to a curve 19 which corresponds to valve 15 and emulates it under standard conditions. Curve 19 has been determined in advance under the above-described standard conditions. The output signal of curve 19 represents a standard mass flow msagrn through valve 15.

Thereafter, standard mass flow msagrn is adjusted to the actual conditions prevailing in internal combustion engine 1. For this purpose, mass flow msagrn is linked multiplicatively at an arithmetic unit 20 with a factor ftagr, which represents the temperature conditions of the exhaust gas at valve 15. Correspondingly, standard mass flow msagrn is linked multiplicatively at an arithmetic unit 21 with a factor fpagr, which represents the pressure conditions of the exhaust gas at valve 15. Both factors ftagr and fpagr are standardized.

Thereafter, the output signal of arithmetic unit 21 is linked, in a curve 22, with the quotient of pressure ps in intake pipe 6 over pressure pagr in exhaust gas pipe 7. In this way, the outflow behavior of valve 15, and thus ultimately the flow behavior of the exhaust gas through valve 15, is taken into account. The output signal of curve 22 is mass flow msagr through valve 15 placed in exhaust gas recirculation line 14.

Mass flow msdk through throttle 8 is subtractively linked at an arithmetic unit 23 with a signal msafg, which will be described below. Similarly, mass flow msagr through valve 15 is linked subtractively at arithmetic unit 24 with a signal msabag, which will also be described below.

The output signals of arithmetic units 23 and 24 are forwarded to integrators 25 and 26, respectively, with which the storage behavior of intake pipe 6 is emulated. The output signals of integrators 25 and 26 are fed to blocks 27 and 28, respectively, in which a particularly temperature-dependent conversion from the particular mass flow to a corresponding pressure is performed. The output signal of block 27 is a pressure psdk in intake pipe 6, which comes from throttle 8. The output signal of block 28 is a pressure psag in intake pipe 6, which comes from valve 15.

At an arithmetic unit 29, the pressures psdk and psag are linked additively with one another and pressure ps in intake pipe 6 results. Pressure ps represents a simulation of the pressure actually prevailing in intake pipe 6. Pressure ps is not a measured pressure, in contrast to the above-described pressure psds.

The calculated pressure ps is compared at an arithmetic unit 30 with a pressure pirg. This pressure pirg corresponds to a pressure in combustion chamber 4 which results from the fact that after a combustion, there is always a certain residual amount of gas which is not expelled from combustion chamber 4, but rather remains in combustion chamber 4. Thus pressure pirg is the residual gas pressure in combustion chamber 4 of internal combustion engine 1.

Pressure pirg is generated by a table 31, which depends on the rotation speed nmot of internal combustion engine 1 and the size °NW of an angle range of the camshaft during which the inlet valve and the outlet valve of the internal combustion engine are both open at the same time. Pressure pirg may also be dependent on the altitude above sea level at which internal combustion engine 1 is located at a particular moment.

The difference generated by arithmetic unit 30 is fed to an arithmetic unit 32, at which the difference is linked multiplicatively with a factor fupsrl. Factor fupsrl serves to convert pressure ps into a mass flow msab fed to combustion chamber 4.

Factor fupsrl is generated in a characteristic diagram 33, among other things, as a function of the rotation speed of internal combustion engine 1 and parameter °NW of the camshaft of internal combustion engine 1. In addition, it is possible to take into account the temperature of the gas in combustion chamber 4 of internal combustion engine 1, which for example can be determined through a model from the temperature of the cooling water of internal combustion engine 1.

The output signal of arithmetic unit 32 is the mass flow msab fed to combustion chamber 4, which is also shown in FIG. 1.

A factor cagr is determined from pressure psdk and pressure psag by control device 17. This factor corresponds to the proportion of recirculated exhaust gas in the mass flow msab fed to combustion chamber 4. Factor cagr thus represents the exhaust gas recirculation rate dependent on the position of valve 15. For factor cagr, it is true that: cagr= psag/psdk=msabag/msab.

The mass flows flowing to and from intake pipe 6 have the following composition: Mass flow msdk and mass flow msagr flow to intake pipe 6, while mass flow msab flows from intake pipe 6 to combustion chamber 4 of internal combustion engine 1. The outflowing mass flow msab is composed of an exhaust gas portion msabag and a fresh gas portion msabfg.

Exhaust gas portion msabag corresponds to a portion of the entire mass flow that is fed to intake pipe 6 via valve 15. This proportion corresponds to factor cagr. The proportion of exhaust gas msabg is thus arrived at from msabg=msab× cagr. This multiplication is realized using an arithmetic unit 34.

The proportion of fresh gas msabfg corresponds to the remaining proportion of the total mass flow msab, i.e., the proportion of the total mass flow msab which is fed through throttle 8 to intake pipe 6. This proportion corresponds to the factor (1−cagr). The proportion of fresh gas msabfg thus results from msabfg=msab×(1−cagr). This multiplication is realized using an arithmetic unit 35.

As described above, the proportion of fresh gas msabfg and of exhaust gas msabag are linked subtractively at arithmetic units 23 and 24 with mass flow msdk through throttle 8 and mass flow msagr through valve 15, respectively. This results in that mass flows msabag and msabfg flowing out from intake pipe 6 are always deducted from the inflowing mass flows msdk and msagr, so that the integrators 25 and 26 provided after arithmetic units 23 and 24 always represent the prevailing value of the mass flow temporarily stored in intake pipe 6.

For example, if valve 15 is opened wider by an adjustment of pulse-duty factor ta_agr, then this has the result that factor cagr becomes larger. This means that more exhaust gas reaches intake pipe 6 through exhaust gas recirculation line 14. In this way, however, the proportion of exhaust gas msabag in mass flow msab fed to combustion chamber 4 also becomes larger. This results from msabag=cagr×msab. At the same time, the proportion of fresh gas msabfg becomes smaller according to msabfg=(1−cagr)×msab. An equilibrium that prevailed previously at arithmetic units 23 and 24 is thus disturbed. To achieve a new equilibrium, mass flow msdk can be increased for example, that is, throttle 8 can be opened wider. This can be achieved with the help of the proportion of fresh gas msabfg, in that the latter is further processed as output signal 36 into a triggering signal for throttle 8.

If pressure sensor 16 is present in the internal combustion engine in the area of intake pipe 6, with which pressure psds can be measured in intake pipe 6, then this pressure psds can likewise be used to generate a signal 37 analogous to output signal 36. For this purpose, the measured pressure psds is first linked subtractively at an arithmetic unit 38 with residual gas pressure pirg in combustion chamber 4. Then the output signal of arithmetic unit 38 is linked multiplicatively at an arithmetic unit 39 with signal fupsrl, with which a conversion of the pressure to a mass flow is achieved. Finally, the output signal of arithmetic unit 39 is linked multiplicatively at another arithmetic unit 40 with the factor (1−cagr) in order thus to establish a reference to the proportion of fresh gas. As a result, signal 37 is then available at the outlet of arithmetic unit 40.

Output signal 36 and signal 37 are fed to a switch 41, which is controllable by control device 17 using an error bit B_fe. Under normal operating conditions, switch 41 is triggered in such a way that signal 37 issuing from pressure sensor 16 present in intake pipe 6 is passed on. If control device 17 determines that this pressure sensor has a defect or the like, for example, then switch 41 is switched over so that output signal 36 is passed on.

In the first case, an output signal 42 is thus generated, which corresponds to signal 37, and which is thus based on the pressure psds in intake pipe 6 actually measured by pressure sensor 16. In the case of an error, the output signal 42 corresponds to output signal 36, which in turn is based on an emulation of pressure ps in intake pipe 6, that is, it is modeled.

What is claimed is:

1. A method for operating an internal combustion engine, comprising the steps of:

feeding air through a throttle to a combustion chamber, the throttle positioned in an intake pipe;

determining a first mass flow flowing through the throttle;

feeding an exhaust gas through a valve to the intake pipe, the valve positioned in an exhaust gas recirculation line;

determining a second mass flow flowing through the valve;

determining a pressure in the intake pipe as a function of the first mass flow and the second mass flow;

before the pressure is determined, integrating the first mass flow and the second mass flow, wherein the pressure in the intake pipe is determined as a function of parameters of the internal combustion engine; and determining a third mass flow as a function of the first mass flow and the second mass flow, the third mass flow being provided to the combustion chamber.

2. A method for operating an internal combustion engine, comprising the steps of:

feeding air through a throttle to a combustion chamber, the throttle positioned in an intake pipe;

determining a first mass flow flowing through the throttle;

feeding an exhaust gas through a valve to the intake pipe, the valve positioned in an exhaust gas recirculation line;

determining a second mass flow flowing through the valve;

determining a third mass flow as a function of the first mass flow and the second mass flow, the third mass flow being provided to the combustion chamber; and determining a standard mass flow through the valve as a function of a pulse-duty factor of the valve, wherein the second mass flow is determined using the standard mass flow and as a function of parameters of the internal combustion engine.

3. A method for operating an internal combustion engine, comprising the steps of:

feeding air through a throttle to a combustion chamber, the throttle positioned in an intake pipe;

determining a first mass flow flowing through the throttle;

feeding an exhaust gas through a valve to the intake pipe, the valve positioned in an exhaust gas recirculation line;

determining a second mass flow flowing through the valve;

determining a third mass flow as a function of the first mass flow and the second mass flow, the third mass flow being provided to the combustion chamber; and linking the third mass flow with a first factor to form a fourth mass flow, the first factor corresponding to a proportion of the third mass flow which is fed through the valve to the intake pipe.

4. The method according to claim 3, further comprising the step of:

linking the fourth mass flow with the second mass flow.

5. A method for operating an internal combustion engine, comprising the steps of:

feeding air through a throttle to a combustion chamber, the throttle positioned in an intake pipe;

determining a first mass flow flowing through the throttle;

feeding an exhaust gas through a valve to the intake pipe, the valve positioned in an exhaust gas recirculation line;

determining a second mass flow flowing through the valve;

determining a third mass flow as a function of the first mass flow and the second mass flow, the third mass flow being provided to the combustion chamber; and linking the third mass flow with a second factor to form a fifth mass flow, the second factor corresponding to a proportion of the third mass flow which is fed through the throttle to the intake pipe.

6. The method according to claim 5, further comprising the step of:

linking the fifth mass flow with the first mass flow.

7. An internal combustion engine having a combustion chamber, comprising:

an intake pipe, the combustion chamber receiving air which flows through the intake pipe;

a throttle arranged in the intake pipe;

an exhaust gas recirculation line, the intake pipe receiving an exhaust gas which flows through the exhaust gas recirculation line;

a valve arranged in the exhaust gas recirculation line; and a control device determining:

an estimated first mass flow flowing through the throttle, a second mass flow flowing through the valve, and a third mass flow as a function of the first mass flow and the second mass flow, the third mass flow being provided to the combustion chamber.

8. The internal combustion engine according to claim 7, wherein the internal combustion engine is in a motor vehicle.

9. A control arrangement of an internal combustion engine, comprising:

a memory device; and a processor for executing a program stored in the memory device to perform the following steps:

feeding air through a throttle to a combustion chamber, the throttle positioned in an intake pipe, determining an estimated first mass flow flowing through the throttle, feeding an exhaust gas through a valve to the intake pipe, the valve positioned in an exhaust gas recirculation line, determining a second mass flow flowing through the valve, and determining a third mass flow as a function of the first mass flow and the second mass flow, the third mass flow being provided to the combustion chamber.

10. The control arrangement according to claim 9, wherein the memory device is a read-only memory device.

11. The control arrangement according to claim 9, wherein the internal combustion engine is in a motor vehicle.

12. A method for operating an internal combustion engine, comprising the steps of:

feeding air through a throttle to a combustion chamber, the throttle positioned in an intake pipe;

determining an estimated first mass flow flowing through the throttle;

feeding an exhaust gas through a valve to the intake pipe, the valve positioned in an exhaust gas recirculation line;

determining a second mass flow flowing through the valve; and determining a third mass flow as a function of the first mass flow and the second mass flow, the third mass flow being provided to the combustion chamber.

13. The method according to claim 12, wherein the internal combustion engine is in a motor vehicle.

14. The method according to claim 12, wherein the estimated first mass flow is not based on a measured first mass flow from a mass flow sensor.

15. The method according to claim 14, wherein the estimated first mass flow is determined based on a position of the throttle.

16. The method according to claim 12, further comprising the step of:

determining a pressure in the intake pipe as a function of the first mass flow and the second mass flow.

17. The method according to claim 16, wherein the third mass flow is determined by converting the pressure in the intake pipe into the third mass flow using parameters of the internal combustion engine.

18. A method for use in operating an internal combustion engine, comprising the steps of:

measuring a pressure in an area of an intake pipe, which is between a throttle and a combustion chamber, by using a pressure sensing arrangement and providing a measured pressure;

determining a first indication of an air-exhaust mixture mass flow based on a first mass flow flowing through a throttle and a second mass flow flowing through a valve;

determining a second indication of the air-exhaust mixture mass flow based on the measured pressure;

determining if there is a failure indication of the pressure sensing arrangement; and outputting the first indication if there is a failure indication, and outputting the second indication if there is no failure indication.

19. The method according to claim 18, wherein the first mass flow is an estimated first mass flow.

20. The method according to claim 19, wherein the estimated first mass flow is not based on a measured first mass flow from a mass flow sensor.

21. The method according to claim 20, wherein the estimated first mass flow is determined based on a position of the throttle.

* * * * *